United States Patent
Faber

(10) Patent No.: US 7,088,848 B2
(45) Date of Patent: Aug. 8, 2006

(54) METHOD FOR THE PRESENTATION OF PROJECTION IMAGES OR TOMOGRAMS FROM 3D VOLUME DATA OF AN EXAMINATION VOLUME

(75) Inventor: Roland Faber, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 716 days.

(21) Appl. No.: 10/360,693

(22) Filed: Feb. 7, 2003

(65) Prior Publication Data

US 2003/0156747 A1    Aug. 21, 2003

(30) Foreign Application Priority Data

Feb. 15, 2002    (DE)    ............................... 102 06 397

(51) Int. Cl.
*G06K 9/00*    (2006.01)
(52) U.S. Cl. ...................... 382/128; 128/922; 378/4; 345/426
(58) Field of Classification Search ............... 382/128, 382/131, 132, 154; 128/922; 378/4; 345/426
See application file for complete search history.

(56) References Cited

U.S. PATENT DOCUMENTS

| | | | | |
|---|---|---|---|---|
| 5,782,762 A | * | 7/1998 | Vining | ........................ 600/407 |
| 6,954,202 B1 | * | 10/2005 | Han et al. | .................... 345/419 |
| 2001/0044576 A1 | * | 11/2001 | Vining | ........................ 600/416 |
| 2002/0130820 A1 | * | 9/2002 | Sullivan | ........................ 345/6 |

FOREIGN PATENT DOCUMENTS

| | | |
|---|---|---|
| DE | 31 06 100 | 9/1982 |
| DE | 44 36 263 | 4/1996 |

* cited by examiner

*Primary Examiner*—Jingge Wu
*Assistant Examiner*—Anand Bhatnagar
(74) *Attorney, Agent, or Firm*—Schiff Hardin LLP

(57) ABSTRACT

In a method for the presentation of projection images or tomograms from 3D volume data of an examination volume, particularly from MR or CT volume data, a grayscale image of a prescribable projection or of a prescribable section that is composed of individual pixels is calculated from the 3D volume data. The distance of a voxel or partial volume of the examination volume represented by the pixel from a reference plane is determined for each pixel of the grayscale image, and a chromatic value corresponding to this distance is allocated to each pixel of the grayscale image, the chromatic value is obtained by color coding of the distance, and a projection image or tomogram is presented by overlaying or coloring the grayscale image with the chromatic values allocated to each pixel. The presentation of a projection image with an unambiguous and immediately understandable depth, information is thereby enabled.

23 Claims, 2 Drawing Sheets

METHOD FOR THE PRESENTATION OF PROJECTION IMAGES OR TOMOGRAMS FROM 3D VOLUME DATA OF AN EXAMINATION VOLUME

BACKGROUND OF THE INVENTION

1. Field of the Invention

The present invention is directed to a method for the presentation of projection images or tomograms from 3D volume data of an examination volume, particularly from MR or CT volume data, wherein a grayscale image of a prescribable projection or of a prescribable section that is composed of individual pixels is calculated from the 3D volume data.

2. Description of the Prior Art

The presentation of projection images or tomograms from 3D volume data plays a significant part in many technical fields, particularly in the field of imaging medical technology. Imaging methods such as magnetic resonance (MR) tomography and computed tomography (CT) acquire information from the entire examination volume of the examined body. X-ray computed tomography is a specific X-ray tomogram exposure method wherein transverse tomograms, i.e. images of body slices oriented essentially perpendicularly to the body axis, are obtained. For this purpose, the examination volume is transirradiated in slices from a number of angles, so that a three-dimensional volume dataset is obtained. The tomograms to be presented are calculated from the 3D volume data by means of suitable projection methods. In addition to such tomograms, other image presentations, for example of surface structures of subjects in the examination volume, can be calculated from the 3D volume data with the assistance of computed tomography techniques.

In magnetic resonance tomography, magnetic resonance signals of an examination volume are acquired using specifically switched, dynamic magnet fields, referred to as gradient fields, and radio-frequency pulses. A magnetic resonance tomogram is calculated from the magnetic resonance signals obtained from different, small body volumes, referred to as voxels, which are being stored as a 3D volume dataset. The position and orientation of the slices of the examination volume to be presented can be arbitrarily selected within broad ranges in both X-ray computed tomography as well as in magnetic resonance tomography. In addition to generating these tomograms or sectional images, different projections from the measured 3D volume data can be calculated and displayed on magnetic resonance tomography. A method that is just being introduced in MR angiography, referred to as MIP (Maximum Intensity Projection) technique, leads to a projection image that enables a presentation of larger vessel sections of the body. In this method, a family of parallel rays is placed through the three-dimensional volume dataset, and only that point having the highest signal intensity is sought along each individual ray. Since blood vessels are imaged with high signal intensity, a respective picture element that belongs to a vessel is thus selected along each ray. This point is then entered into the projection plane, which lies perpendicular to the rays, at the end of the respective ray. A projection image of the vascular system that makes a plastic impression arises in this way. The same technique can also be applied in computer tomography. The tomograms or projection images generated with this method usually are calculated and displayed as grayscale images.

The images of the calculation or projections methods that are utilized for the image presentation usually contain no depth information, so that the spatial relationships of the anatomical details presented in the image relative to one another cannot be clearly perceived and misinterpretations by the viewer are possible. Various projection directions are shown in continuous succession as a moving image for visualizing the spatial relationship of anatomical details, for example in the MIP technique, in order to thereby convey a spatial impression to the viewer. This, however, is computationally complicated and nonetheless cannot always be applied. The presentation is not immediately clear if covering exists, since a "front-back" transposition corresponds to a reversal of the rotational sense if the other presentation parameters are unaltered. Further, special devices such as 3D glasses are known that offer respectively different viewing directions to each eye. These glasses, however, assume a good spatial visualization and have not yet been able to prevail in practice. Back voxels are presented attenuated due to the intensity coding of the distance, so that a loss of contrast occurs.

German OS 44 36 263 discloses a method as well as a system for the presentation of 3D measured data of a volume in two-dimensional tomograms, wherein the tomogram of the slice to be presented is overlaid with the tomograms of neighboring slices. The information important to the viewer, namely which of the image details lie in front of or behind the slice to be presented, is achieved by different chromatic presentation of the overlaid tomograms. The method serves the purpose of conveying the direction of the further course of the subjects visible in the tomogram to the viewer of a tomogram. Although the three-dimensional relationship between the slice to be presented and its immediate environment is visualized for the viewer of a tomogram with this method, the method does not supply any depth information that, in particular, can be important in projection images.

SUMMARY OF THE INVENTION

An object of the present invention is to provide a method for the presentation of projection images or tomograms from 3D volume data of an examination volume that supplies the viewer of the image with dependable depth information. As used herein by 3D volume data means a measured dataset that contains measured values from different partial volumes of a three-dimensional examination volume.

This object is achieved in accordance with the invention in a method, which is particularly suited for MR or CT volume data, wherein a grayscale image of a prescribable projection or of a prescribable section composed of individual pixels is calculated in a known way, and the distance of a voxel or partial volume of the examination volume represented by the pixel from a prescribable reference plane is determined, for each pixel of the grayscale image, from the 3D volume data, and a chromatic value corresponding to this distance is allocated to each pixel of the grayscale image. The chromatic value is obtained by color coding of the distance by, for example, a distance scale being operated with a color scale. Finally, the projection image or tomogram is presented by overlaying or coloring the grayscale image with the chromatic values allocated to each pixel. Of course, the overlaying or coloring ensues such that the detail information of the grayscale image is not masked by the superimposed color information.

Preferably, the overlay is realized by a color coded distance image being produced from the chromatic values allocated to each pixel of the grayscale image, the distance image being superimposed on the grayscale image for the presentation of the projection image or, respectively, tomogram. This overlaying preferably ensues by means of a method that can be parameterized such as, for example, alpha blending wherein the relative weight of the two superimposed images can be freely selected. The user thus can also prescribe a corresponding weighting wherein, for example, the distance image is presented with less intensity for better recognition of the details of the grayscale image, or with greater intensity than the grayscale image for better recognition of the depth information.

As a result of the present method, the depth information can be seen directly by the viewer of the projection image or tomogram over the individual details that are recognizable in the image. The chromatic presentation of the depth information, which is based on a color coding, is unambiguous and can be directly understood. It avoids interpretation errors in the evaluation of auxiliary information such as, for example, image labels or prior anatomical knowledge that play a large part particularly in the field of imaging medical examination methods. The parameterization of the overlay method (for example, alpha coding) allows an optimized presentation of the structure information of the grayscale image that the user can adapt to the respective requirements by prescribing or modifying the corresponding weighting parameters.

The imaging of the distance values onto the color scale can ensue linearly and preferably is scaled. However, non-linear, for example logarithmic imagings that can be parameterized also can be utilized in order to present specific distance ranges such as, for example, the near range in a preferentially resolved manner. An adaptation of the color differentiation to the volume region of interest (RoI) within the examination volume is possible by means of such a parameterization or scalability of the distance coding.

The prescribable reference plane, with respect to which the distance of the individual voxels that are relevant for the image from the 3D volume data is determined, can be differently selected. In the presentation of projection images such as, for example, MIP images, this reference plane is selected in conformity with the projection or image plane. In the presentation of tomograms, which usually do not require any depth information due to the slight depth of the presented slices, the present method is applied slices that are oriented singly or doubly oblique. The reference plane is thereby selected perpendicular to a desired direction of view, preferably along a body axis (sagittal, coronary, transverse), so that the tilt and the tilt direction of the slices or sections relative to this axis can be recognized from the color distribution of the tomograms produced therewith. In particular, this helps avoid errors in the evaluation of the image labels while viewing the respective images.

DESCRIPTION OF THE PREFERRED EMBODIMENTS

Figure 1:
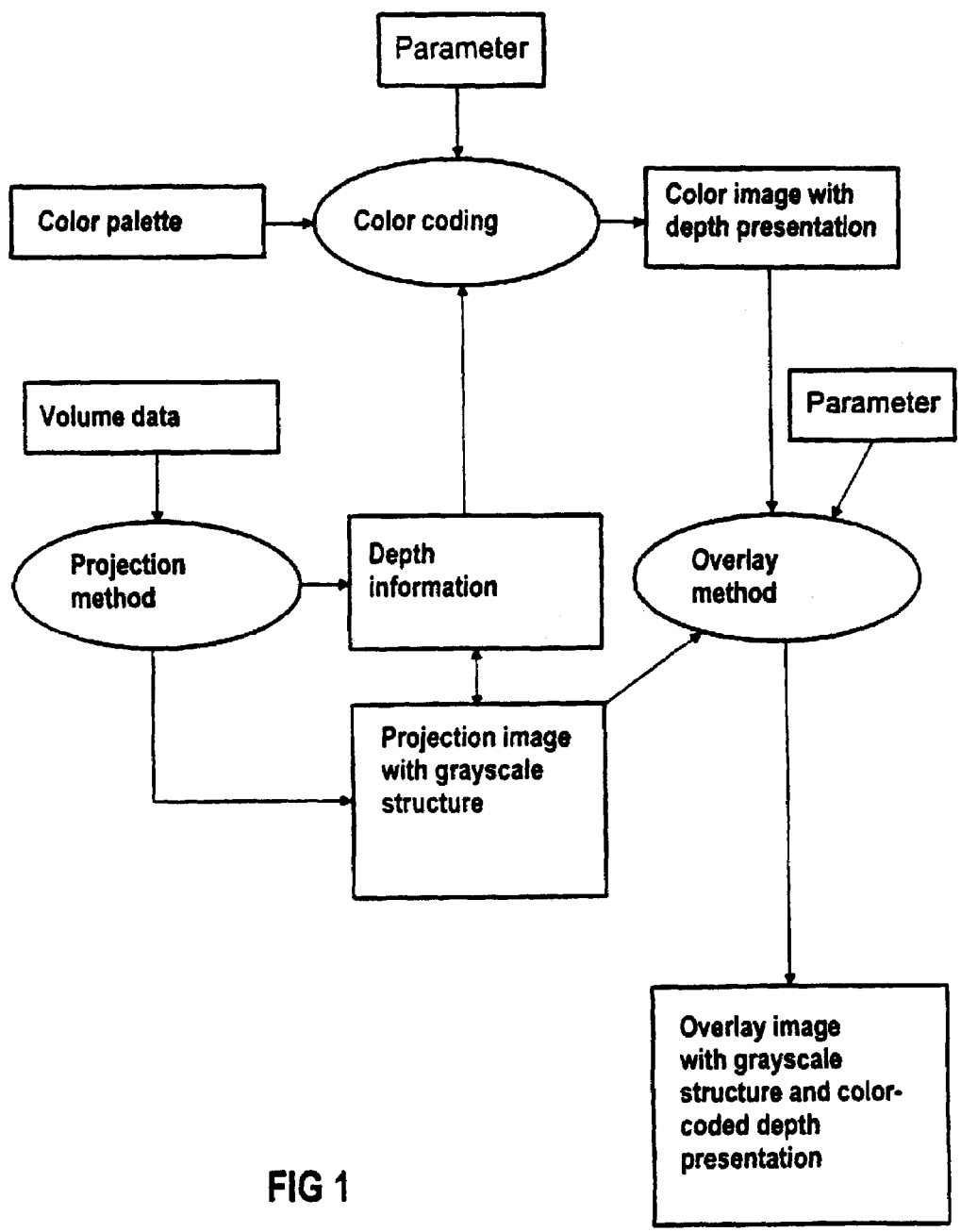
FIG. 1 is a flowchart of an example of the implementation of the present method.

FIG. 1 shows a schematic illustration of the present method in an overview. After the acquisition of the 3D volume data with a suitable measurement technique such as, for example, magnetic resonance tomography or computed tomography, a provisional projection image having a grayscale structure (referred to below as a grayscale image) is calculated from the volume data by means of a suitable projection method that is dependent on the data acquisition technique and the desired image result. Simultaneously or subsequently, the information contained in the 3D volume data about the distance of the voxel or point in the examination volume on which each pixel in the grayscale image is based is determined. A chromatic value that corresponds to the distance of the presented point in the examination volume from the image plane is allocated to each pixel of the grayscale image by means of a color coding based on a color palette. A color image with depth presentation is produced in this way; this is referred to below as color-coded distance image. The color-coded distance image is overlaid on the original grayscale image by means of a parameterizable overlay method such that the, for example, anatomical structure underlying the grayscale image remains visible to the viewer.

The imaging of the distance values on the color scale can be linear or non-linear and preferably is scaled in order to provide the viewer with the possibility of an adaptation to the region of interest of the examination volume. The corresponding scaling is entered via a suitable parameter. The weighting of the color-coded distance image relative to the grayscale image in the overlay or projection image can be varied or prescribed by prescribable parameters for the overlay method.

Figure 2:
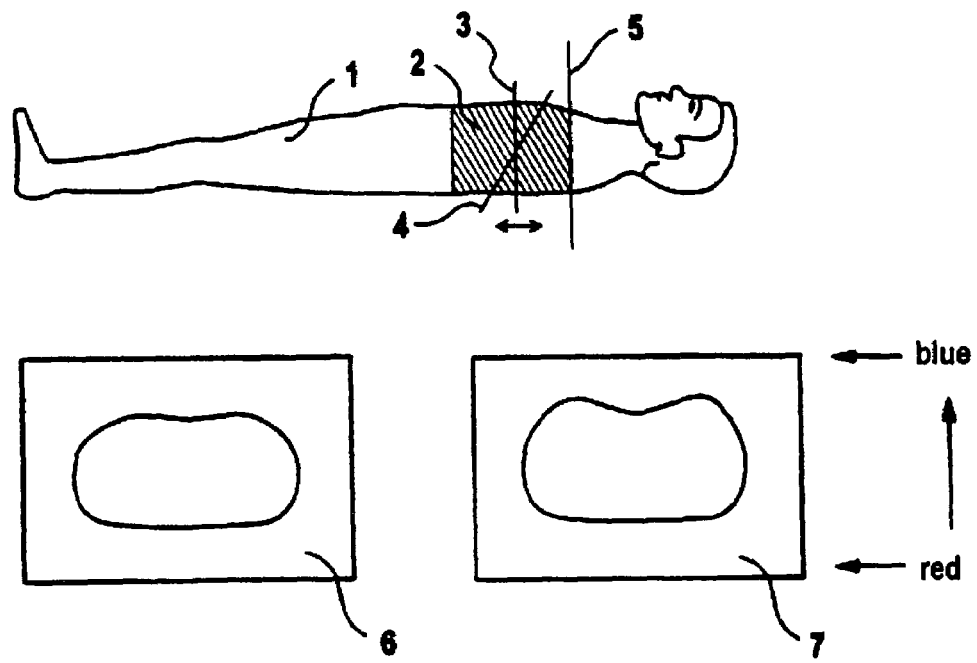
FIG. 2 schematically illustrates the application of the method for producing a tomogram.

FIG. 2 shows a highly schematic illustration of an example for explaining the present method in the presentation of the spatial orientation of a tomogram. FIG. 2 shows a patient body 1 from which three-dimensional volume data of an examination volume 2 are acquired via a suitable imaging technique. A tomogram 6 of a slice 3 of the patient body 1, having a sectional plane perpendicular to the body axis, can be obtained from the three-dimensional volume data. In many instances, however a sectional presentation with an orientation does not lie perpendicular to the body axis is wanted. Such a singly or doubly tilted tomogram (for example, transverse>sagittal) can be advantageously presented with the present method. FIG. 2 shows an example wherein a tomogram of a slice 4 that is singly tilted is to be presented. The tomogram 7 thus obtained is shown highly schematically. This tomogram contains a conventional grayscale image that is overlaid with a color-coded distance image. The color-coded distance image is obtained by color coding the distance of the individual points of the slice 4 from a reference plane 5 that is selected perpendicular to the longitudinal axis of the patient body. The distance is indicated by the double arrow in FIG. 2. A variation of the color of the individual pixels from the bottom, for example red, to the top, for example blue that corresponds to the decreasing distance of the illustrated slice from the reference plane is visible to the viewer in the tomogram 7 obtained in this way. The viewer of this tomogram thus can immediately recognize the tilt direction and, given knowledge of the scaling of the color scale, also can recognize the degree of tilt. The method thus enables the direct visual presentation of the spatial orientation of each pixel relative to the main direction of view (sagittal in this case), so that an interpretation of image labels that indicate the orientation of the illustrated slice is eliminated.

Figure 3:
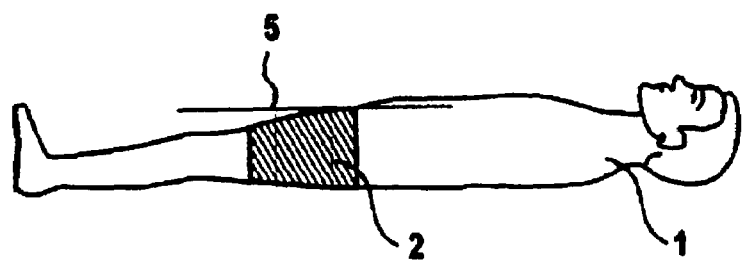
FIG. 3 is a further illustration of the method for generating a projection image of an expansive region of interest.

FIG. 3 shows another example for the application of the present method in projection images that represent the projection of a three-dimensional region of interest onto a corresponding image plane. One example of such a projection is the MIP presentation of vessels of the human body. FIG. 3 shows a patient 1 from whom three-dimensional volume data are acquired from an examination volume 2 that simultaneously represents the region of interest (RoI). A projection image is to be produced from these 3D volume data, this projection image corresponding to a projection of this volume 2 onto an image plane 5 that simultaneously represents the reference plane for the present method. After the calculation of the grayscale image by means of a suitable projection method that projects this volume region onto the image plane 5, the distance of the underlying point or voxel of the examination volume 2 from the reference plane 5 is identified for each picture element of the grayscale image. The distance is also indicated with the double arrow in this illustration. A color-coded distance image that is overlaid on the grayscale image for the presentation of the projection image is produced from this depth information. The viewer now can directly recognize the vessels visible on the basis of the grayscale image as well as their spacing relative to the reference plane 5 or image plane directly from the image on the basis of the color. This enables a direct recognition of covering or masking of individual vessels and their sequence. Which vessel lies in front and which vessel lies behind is immediately clear as a result of the color coding.

Of course, known, standardized color scales such as, for example, the glow scale, or spatially designed color scales can be utilized for the color coding. The method is particularly suited for 3D volume data of imaging methods of medical technology such as, for example, MR or CT volume data. Of course, the present method also can be utilized in other fields of technology, for example in materials' testing, wherein it is desirable to produce projection images that contain depth information.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for presenting a projection image from 3D volume data representing an examination volume, comprising the steps of:
   from 3D volume data representing an examination volume, calculating a grayscale image in a computer of a selected projection of said examination volume, said grayscale image comprising a plurality of pixels respectively representing voxels in said examination volume;
   in said computer, for each of said pixels calculating a distance of the voxel represented thereby from a reference plane, each distance having a magnitude;
   in said computer, color-coding said pixels with respective chromatic values dependent on the magnitude of the distance calculated for that pixel; and
   displaying said selected projection on an electronic display as a combination of said grayscale image and said color-coded pixels.

2. A method as claimed in claim 1 comprising forming said combination of said grayscale image and said color-coded pixels by generating a color-coded distance image from said chromatic values, and superimposing said color-coded distance image on said grayscale image.

3. A method as claimed in claim 2 comprising assigning respective weightings relative to each other to said color-coded distance image and said grayscale image.

4. A method as claimed in claim 1 comprising forming said combination of said grayscale image and said color-coded pixels by coloring the pixels comprising said grayscale image.

5. A method as claimed in claim 1 comprising employing magnetic resonance volume data as said 3D volume data.

6. A method as claimed in claim 1 comprising employing computed tomography volume data as said 3D volume data.

7. A method as claimed in claim 1 wherein said grayscale image has an image plane, and employing said image plane as said reference plane.

8. A method as claimed in claim 1 comprising generating said chromatic values by operating on a color scale with a distance scale via a scalable linear function.

9. A method as claimed in claim 1 comprising generating said chromatic values by operating on a color scale with a distance scale via a scalable non-linear function.

10. A method as claimed in claim 9 wherein said non-linear function operates on said color scale with a distance scale having a higher distance resolution in a selectable range of said distance scale, compared to a remainder of said distance scale.

11. A method as claimed in claim 1 wherein the step of combining said grayscale image with said color-coded pixels comprises overlaying said grayscale image with the respective chromatic values using an alpha blending technique.

12. A method as claimed in claim 1 comprising calculating said grayscale image using an MIP technique as a projection method.

13. A method for presenting a tomogram from 3D volume data representing an examination volume, comprising the steps of:
    from 3D volume data representing an examination volume, calculating a grayscale image in a computer of a selected section of said examination volume, said grayscale image comprising a plurality of pixels respectively representing partial volumes in said examination volume;
    in said computer, for each of said pixels calculating a distance of the partial volume represented thereby from a reference plane, each distance having a magnitude;
    in said computer, color-coding said pixels with respective chromatic values dependent on the magnitude of the distance calculated for that pixel; and
    displaying said selected section on an electronic display as a combination of said grayscale image and said color-coded pixels.

14. A method as claimed in claim 13 comprising forming said combination of said grayscale image and said color-coded pixels by generating a color-coded distance image from said chromatic values, and superimposing said color-coded distance image on said grayscale image.

15. A method as claimed in claim 14 comprising assigning respective weightings relative to each other to said color-coded distance image and said grayscale image.

16. A method as claimed in claim 13 comprising forming said combination of said grayscale image and said color-coded pixels by coloring the pixels comprising said grayscale image.

17. A method as claimed in claim 13 comprising employing magnetic resonance volume data as said 3D volume data.

18. A method as claimed in claim 13 comprising employing computed tomography volume data as said 3D volume data.

19. A method as claimed in claim 13 comprising generating said chromatic values by operating on a color scale with a distance scale via a scalable linear function.

20. A method as claimed in claim 13 comprising generating said chromatic values by operating on a color scale with a distance scale via a scalable non-linear function.

21. A method as claimed in claim 20 wherein said non-linear function operates on said color scale with a distance scale having a higher distance resolution in a selectable range of said distance scale, compared to a remainder of said distance scale.

22. A method as claimed in claim 13 wherein the step of combining said grayscale image with said color-coded pixels comprises overlaying said grayscale image with the respective chromatic values using an alpha blending technique.

23. A method as claimed in claim 13 comprising calculating said grayscale image as a tomogram of said examination volume that is tilted relative to at least one axis of said tomogram.

* * * * *